United States Patent Office 2,952,706
Patented Sept. 13, 1960

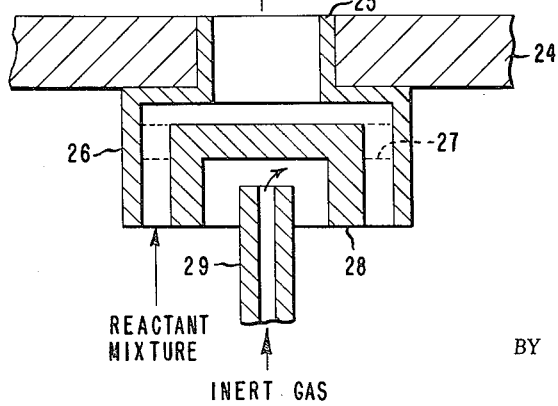

2,952,706
PREPARATION OF THIOCARBONYL FLUORIDE

Robert D. Lipscomb, Wilmington, Del., assignor to E. I. du Pont de Nemours and Company, Wilmington, Del., a corporation of Delaware Filed Sept. 15, 1958, Ser. No. 761,122

9 Claims. (Cl. 260—543)

This invention relates to a new process of synthesizing thiocarbonyl fluoride.

Thiocarbonyl fluoride, $CSF_2$, is a virtually unknown compound. It has been mentioned in the literature on one or two occasions (e.g., by Tyczkowski and Bigelow, J. Am. Chem. Soc. 75, 3523 (1953); Haszeldine and Kidd, J. Chem. Soc. 1955, 3871) but it is clear from the published reports that it has never been obtained in sufficient amount and purity to permit a study of its properties. No satisfactory method of preparing thiocarbonyl fluoride was known until the recent discovery, described in application Serial No. 665,142, filed June 12, 1957, by W. J. Middleton, of common assignment herewith, that it forms on pyrolysis of tetrafluoro-1,3-dithietane,

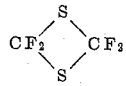

which is itself prepared by fluorination of the known tetrachloro-1,3-dithietane. While this method is satisfactory, it requires several steps from the basic chemicals, and the use of relatively costly fluorinating agents.

As described in application Serial No. 665,142, thiocarbonyl fluoride is a highly useful chemical, owing to its aptitude to polymerize to an elastomer possessing desirable properties over a wide temperature range and unusual inertness. Improved methods of preparing monomeric thiocarbonyl fluoride are quite desirable. Provision of a new and improved method of preparing thiocarbonyl fluoride is thus the principal object of the invention.

In accordance with the above-mentioned and additional objects, there is now provided a new process of preparing thiocarbonyl fluoride which comprises heating, at a temperature of at least 1500° C., carbon disulfide with a binary fluoride of an element of groups IV–A, V–A and VI–A of the periodic table, said element having an atomic number from 6–16, inclusive.

The periodic table referred to herein is Deming's Periodic Table, as given in Deming's "General Chemistry" (John Wiley & Sons, Inc., 5th ed., pp. 11–13) and in many other reference books such as the Handbook of Chemistry and Physics published by the Chemical Rubber Publishing Co. The elements whose fluorides are suitable for use in this process are carbon, silicon, nitrogen, phosphorus, oxygen and sulfur. Thus, the suitable fluorides include the carbon fluorides (fluorocarbons), the silicon fluorides, nitrogen trifluoride, phosphorus pentafluoride, oxygen difluoride, sulfur tetrafluoride and sulfur hexafluoride. The most useful and preferred fluorides are the aliphatic fluorocarbons of one to two carbon atoms (carbon tetrafluoride, hexafluoroethane, tetrafluoroethylene), nitrogen trifluoride and phosphorus pentafluoride.

The relative proportions of fluoride and carbon disulfide are not critical. They are important only to the extent that maximum utilization of the fluoride, which is normally the more expensive reactant, and minimum formation of by-products, are desired. In practice, it is recommended, although not essential, to use between 0.1 and 10 moles, and preferably between 0.2 and 5 moles of carbon disulfide per mole of fluoride.

In general, the reaction between carbon disulfide and the specified fluorides to give thiocarbonyl fluoride does not proceed at a practical rate below about 1500° C. Thus, reaction temperatures of at least 1500° C. should be employed. The temperature can be as high as can be obtained by practical means. For example, a preferred device for achieving the necessary high temperatures is the electric arc, by means of which temperatures of the order of 2500–4000° C. or even higher can be obtained. The optimum temperature depends in large part on the reactivity of the fluoride employed. Thus, relatively reactive fluorides such as nitrogen trifluoride or sulfur tetrafluoride do not require as high a temperature as the more inert fluorides such as carbon tetrafluoride or silicon tetrafluoride.

The process of this invention can be carried out in various ways. In one embodiment, a vaporized mixture of carbon disulfide and the fluoride employed, if desired with a carrier gas such as nitrogen, helium or argon, is passed through a reaction zone heated to a temperature of at least 1500° C. The reactor can be a tube of refractory material heated externally to the desired temperature by conventional means, e.g., an electric resistance or induction furnace. The tube may be packed with contact masses of refractory material, e.g., carbon chips, to facilitate uniform heating of the vapors.

In a variation of this method, a short, but very hot reaction zone is heated by an electric arc, without, however, allowing contact between the reactants and the arc flame, or plasma. This can be accomplished by means of an electrode arrangement comprising a hollow, cup-shaped anode inside which is positioned a hollow tubular cathode. The arc is struck between the tip of the cathode and the inside wall of the cup-shaped anode. It is thus confined within the cup, and further shielded from contact with the reactant vapors by a gas, e.g., nitrogen, introduced continuously through the hollow cathode. The vaporized reactant mixture passes through a narrow annular space formed by the outside wall of the anode and a somewhat wider concentric tube surrounding it, this space constituting the reaction zone. Pyrolysis takes place on the outside wall of the anode, which is heated uniformly by the arc inside it to a temperature estimated to be of the order of 2000° C.

In yet another embodiment the reaction mixture is pyrolyzed by passing it directly through the flame of an electric arc, where temperatures estimated to be in the range of 2500–4000° C. or even higher are achieved. The arc can be, and most conveniently is, a carbon arc, but arcs in which one or both electrodes are made of metal (e.g., copper, tungsten) are also entirely suitable. When carbon electrodes are used, it is generally found that they suffer little or no attrition, indicating that the carbon consumed in the reaction is essentially entirely supplied by the carbon disulfide.

The pressure at which the reaction is carried out is not critical. In general, however, it is much preferred to operate at reduced pressures, which can be as low as 1 mm. of mercury but are desirably in the range of 10–300 mm. of mercury. This is especially desirable when an electric arc is used as the source of heat, since the operation of the arc becomes more difficult with increase in pressure. With other types of reactors, e.g., externally heated tubular reactors, the absolute pressure is again much preferably subatmospheric, e.g., in the range of 10–300 mm., but it can be atmospheric or even superatmospheric.

It is not necessary that the gaseous product emerging from the hot reaction zone be subjected to a special quenching treatment. Normal cooling of the gas by contact with unheated or water-cooled portions of the apparatus is sufficient to prevent appreciable decomposition of the thiocarbonyl fluoride. If desired, however, special measures can be taken to cool the gaseous reaction product very rapidly, for example to bring it down to 400–500° C. or lower within one-tenth second or less after leaving the reaction zone.

When an electric arc is used as the source of heat for the pyrolysis, the electrodes can be made of a heat- and corrosion-resistant metal such as copper or tungsten. If desired, such metal electrodes can be kept relatively cool through internal circulation of a cooling liquid, to prevent or minimize corrosion. Preferably, the arc electrodes are made of porous carbon or graphite. When using carbon electrodes, the anode can, if desired, be maintained at a relatively low temperature, below about 1500° C. This cooling, which is by no means essential, although it tends to increase the life of the electrode, can be accomplished by using a relatively thin anode supported by, and in intimate contact with, a water-cooled metallic holder. In a low tension arc, the cathode cannot be similarly cooled since its temperature must be high enough to sustain thermal emission of electrons.

Improved forms of carbon arc, for use in the synthesis of fluorocarbons, are described in U.S. Patent 2,709,192 and in other patents. These are suitable for use in the present process.

A preferred type of electric arc for use in this process is a magnetically rotated arc. In comparison with static arcs of conventional design or even with the improved arcs of the kind mentioned above, a rotating arc is far more efficient by virtue of its much greater stability and of the far better contact between arc and reactants that it permits. The electric arcs used in the examples which follow were of this kind.

A particularly efficient type of rotating carbon arc operates as follows: The reactants (vaporized mixture of carbon disulfide and the fluoride employed) pass through a symmetrical annular gap formed by a substantially cylindrical solid graphite cathode and a substantially cylindrical hollow graphite anode, wherein a continuous electrical discharge is rotated by magnetic lines of flux essentially parallel to the axis of rotation of the annular arc. This causes the arc to move at right angle to the magnetic field lines. The magnetic field is created by surrounding the arc chamber with a coil through which a current (preferably a direct current) passes. A field strength suitable to cause rotation is 100–200 gauss. The arc rotates extremely rapidly in the annular gap between the electrodes, its speed being estimated at 1000–10,000 revolutions per second, and it heats the reactants very uniformly to extremely high temperatures at they pass through the gap. The gaseous reaction product leaves the arc chamber through the hollow anode and is immediately cooled by contact with cold portions of the apparatus or with a specially designed quenching unit.

The electrical characteristics of the rotating arc are essentially similar to those of the static arc. Thus, operating conditions of the arc may be varied over a wide range from the minimum voltage required to maintain the arc to very high voltages, e.g., in the range of 10 to 75 volts. In general, for a given current the required voltage of the arc is determined by the pressure in the system, the width of the arc gap, and the nature of the gases present in the arc chamber. The power requirements will, of course, depend on the quantity of reactants passed through the rotating arc and the temperature to which they are to be heated.

The arc may be operated with a direct current or with an alternating current if the alternating current is of high frequency and is employed in combination with an alternating magnetic field which is in phase with the arc current. A direct current is greatly preferred, since only with a direct current it is possible to obtain a truly continuous rotating arc resulting in uniform heating and high stability. Current intensities in the range of 20 to 700 amperes are generally used.

The gaseous reaction product, after leaving the hot reaction zone, is conveniently collected as a condensate in traps maintained at a sufficiently low temperature, for example by external cooling with liquid nitrogen.

Figure 1 is a vertical section, more or less diagrammatical, of a form of reactor suitable for use in this invention. The apparatus illustrated is a rotating arc employing the principle discussed above.

Briefly described, the reactor comprises essentially a water-jacketed reaction chamber 1 made of silica glass, having a diameter of 2¾" and narrowing at its lower end to a ¾" diameter tube 2. The reaction chamber 1 is held inside a glass water-jacket 3 by means of a rubber seal 4 through which the tube 2 passes. Inside tube 2 is held, through the rubber bushing 5, a water-jacketed copper tube 6 serving as inlet for the gaseous reactants, which enter the reaction chamber through perforations 7. Tube 6 also serves as holder for the cathode 8, which is a graphite rod 3/16" in diameter, mounted on tube 6 through a graphite guide bushing 9, which also serves as the electrical contact for the cathode.

The anode is a graphite sleeve 10, 5/16" inside diameter, mounted on the inside of a hollow, ring-shaped copper holder 11, cooled with circulating water. The end of the cathode is concentric with the anode and essentially flush with the upper part of it, so that the arc flame is located in the annular space between anode and cathode.

Immediately above the arc zone is located a cooling, or quenching, unit consisting of a cylindrical copper vessel 12 open at the top, which may contain a coolant such as water, solid carbon dioxide or liquid nitrogen. The gases emerging from the arc zone impinge on the outside surface of vessel 12 where they are cooled, and they are drawn from the reactor through outlet tube 13, which leads to a system of cold traps (not shown) where the gases condense. The cooling vessel 12 is held in place inside a copper cylinder of 2" diameter 14 by means of a hollow ring-shaped lid 15 and a rubber gasket 16. In order to keep gasket 16 from becoming brittle when a very cold coolant is used, steam or hot water can be circulated inside the hollow lid 15 through pipes 17.

The reaction chamber 1, the anode holder 11 and the cooling vessel 12 are fastened together through appropriate threaded rods 18 and wing nuts 19. Reduced pressure is applied to the reaction chamber by means of a pump (not shown) connected to the exit end of the cold trap system.

The arc is rotated by means of a magnetic field generated by a D.C. current passing through the solenoid magnet 20, surrounding the arc portion of the reaction chamber. This magnet is constructed of 250 turns of insulated, 8-gage copper wire. It is wired in series (wiring circuit not shown) with the arc, the current being supplied to the electrodes through terminal 21, which is directly attached to the cathode holder 6, and terminal 22, which is attached to the copper plate 23 holding the reaction chamber by means of the tie rods to the anode holder 11. The current is transmitted through the tie rods to the anode holder and thence to the anode.

The apparatus just described represents but one suitable type of electric arc reactor. Various modifications in form and design can be made without affecting the principle and operation of this process, which does not depend on the specific type of equipment used.

An example of such a modification is the electrode arrangement shown in section in Figure 2, which illustrates the already-mentioned embodiment wherein the reactants are passed through a short, very hot reaction zone heated by an electric arc without, however, passing through the arc flame itself.

In Figure 2, a hollow, water-cooled copper ring 24 serves as holder for a ring-shaped graphite anode 25 which flares out into a short cylinder of larger diameter 26 below the anode holder. A perforated graphite disc 27 connects, and maintains in electrical contact, the cylinder 26 with the inner portion of the anode, which is a hollow, inverted graphite cup 28. Inside this cup 28 is positioned a hollow graphite tube 29 serving as the cathode. The arc is struck between the tip of the cathode 29 and the inside wall of the cup 28, and thus is not in contact with the gaseous reactant mixture which passes in the narrow annular hot zone formed by the outside wall of the cup 28 and the inside wall of the cylinder 26 and leaves the reaction zone through the perforated disc 27. A slow stream of a substantially inert gas is passed at the same time through the hollow cathode 29 and helps to shield the reactant gases from contact with the arc flame. It will be understood that conventional gas conduits, electrical contacts, supports (not shown), etc., will be provided as desired.

The reaction in the process of this invention normally gives a mixture of products. Besides thiocarbonyl fluoride, there may also be present unreacted carbon disulfide and unreacted fluoride, both of which can be recycled, elemental sulfur and the free element whose fluoride was employed, or compounds thereof. In addition, fluorocarbons are usually present, even when the fluoride employed contains no carbon. These fluorocarbons include principally carbon tetrafluoride, hexafluoroethane and tetrafluoroethylene, with minor amounts of other saturated or unsaturated fluorocarbons of three or more carbon atoms. Fluorocarbons, in particular carbon tetrafluoride and tetrafluoroethylene, are highly useful technical materials and they constitute valuable by-products of the process. When nitrogen is present in the system, the reaction product may also contain appreciable amounts of cyanogen fluoride, and other nitrogenous products such as cyanogen. These various components can be separated by low temperature fractionation of the reaction product. In this manner, thiocarbonyl fluoride of high purity can be obtained. This is a colorless liquid at temperatures below its boiling point, which is —54° C. at atmospheric pressure.

The following examples illustrate the invention:

*Example I*

A gaseous mixture of carbon disulfide and carbon tetrafluoride in a molar ratio of 0.77:1 was passed at the rate of about 285 ml./minute (calculated at standard temperature and pressure) through a magnetically rotated carbon arc. The pressure inside the arc chamber was 77 mm. of mercury. The reactants were mixed with two or three volumes of nitrogen before passage through the arc to decrease contact time with the arc and to increase the rate of quenching. The cathode was a graphite rod, $\frac{3}{16}$" in diameter, and the anode was a graphite cylinder having an internal diameter of 0.5" and cooled externally by means of a water-cooled, ring-shaped copper holder. The arc was operated at 54 volts and 39 amperes. After traversing the arc flame in the annular space between the electrodes, the product gases impinged on a liquid nitrogen-cooled copper surface located about 0.5" downstream from the arc, where they were rapidly quenched.

The condensable product collected in a trap cooled with liquid nitrogen was found by mass spectroscopic analysis to contain, on a molar basis, 16% of thiocarbonyl fluoride and 11% of cyanogen fluoride, the latter being formed from the nitrogen introduced with the reactants. The product also contained 34% of unreacted carbon disulfide, 31% of unchanged carbon tetrafluoride, and minor amounts of several other products. The electrodes suffered only very slight attrition during the run.

By substituting argon or another fully inert gas for the nitrogen carrier gas, or by operating without a carrier gas, the concurrent formation of cyanogen fluoride can be eliminated, as shown in the following example.

*Example II*

A mixture of carbon disulfide and carbon tetrafluoride in a molar ratio of 1.1:1 was passed at the rate of 455 ml./minute (calculated at standard temperature and pressure) through the rotating arc of Example I. The arc was operated at 40 volts and 42 amperes and the operating pressure was 78 mm. of mercury.

The gaseous reaction product was found to contain, on a molar basis, 58% of unchanged carbon disulfide, 6% of thiocarbonyl fluoride, 15% of carbon tetrafluoride, 15% of tetrafluoroethylene, 4% of other fluorocarbons, and about 2% of argon, which was used in small amounts to assist in pressure regulation in the reactor.

*Example III*

A mixture of carbon disulfide and tetrafluoroethylene in a molar ratio of 1:1 was passed at the rate of 270 ml./minute (calculated at standard temperature and pressure) through the rotating arc of Example I. The arc was operated at 36 volts and 40 amperes and the operating pressure was 64 mm. of mercury.

The gaseous reaction product contained, on a molar basis, 17% of unchanged tetrafluoroethylene and 47% of unchanged carbon disulfide, 10% of thiocarbonyl fluoride, 18% of carbon tetrafluoride and 7% of higher fluorocarbons. The electrode weight was essentially the same at the end of the operation.

*Example IV*

A mixture of carbon disulfide and sulfur tetrafluoride in a molar ratio of 2:1 was passed at the rate of 430 ml./minute (calculated at standard temperature and pressure) through the rotating arc of Example I. The arc was operated at 38 volts and 43 amperes and the operating pressure was 52 mm. of mercury.

The product contained, on a molar basis, 47–50% of carbon disulfide, 1.2–1.7% of thiocarbonyl fluoride, 20–21% of carbon tetrafluoride, and 11–12% of perfluoromethyl sulfides, with small amounts of other products.

*Example V*

A mixture of carbon disulfide and nitrogen trifluoride in a molar ratio of 3.1:1 was passed at the rate of 244 ml./minute (calculated at standard temperature and pressure) through the rotating carbon arc of Example I. The arc was operated at 34 volts and 42 amperes and the operating pressure was 35 mm. of mercury.

The condensable product, collected in a trap cooled with liquid nitrogen, contained, on a molar basis, 20% of thiocarbonyl fluoride, 56% of unchanged carbon disulfide, 11% of carbon tetrafluoride, 6% of cyanogen fluoride, 4% of hexafluoroethane and minor amounts of other products.

*Example VI*

A mixtureof carbon disulfide and phosphorus pentafluoride in a molar ratio of 1.4:1 was passed at the rate of 325 ml./minute (calculated at standard temperature and pressure) through the rotating carbon arc of Example I. The arc was operated at 38 volts and 40 amperes and under an absolute pressure of 30 mm. of mercury.

The condensable product, collected in a trap cooled with liquid nitrogen, contained, on a molar basis, 8% of thiocarbonyl fluoride, 50% of unchanged carbon disulfide, 22% of phosphorus trifluoride, 11% of phosphorus oxyfluoride, 4% of carbon tetrafluoride, and minor amounts of other products. The carbon electrodes suffered no attrition under the operating conditions.

*Example VII*

The apparatus used in this example was a magnetically rotated arc essentially similar to that of Example I except that the cathode was a ½" graphite rod and the anode was a hollow, tapered graphite cone having an inside diameter of ⅝" at the top and ¼" at the bottom, or exit end. The quenching element was a copper trap cooled with liquid nitrogen and located immediately below the lower end of the anode. The arc was a high intensity arc, operated at 18 volts and 600 amperes. The pressure within the arc chamber was 25 mm. of mercury.

A mixture of carbon disulfide and silicon tetrafluoride in a molar ratio of 1.7:1 was passed through the arc at the rate of about 245 ml./minute (calculated at standard temperature and pressure). The product condensed on the liquid nitrogen-cooled quenching element was transferred to a stainless steel cylinder. The vapor phase of this product was found by mass spectroscopy to contain, on a molar basis, 2.5% of thiocarbonyl fluoride, 8.8% of carbon disulfide, 30.6% of silicon tetrafluoride, 40.6% of carbon tetrafluoride, 9.5% of tetrafluoroethylene, 6.8% of other fluorocarbons and minor amounts of other products. The liquid phase of the reaction product was essentially all unchanged carbon disulfide.

Since obvious modifications in the invention will be evident to those skilled in the chemical arts, I propose to be bound solely by the appended claims.

The embodiments of the invention in which an exclusive property or privilege is claimed are defined as follows:

1. The process which comprises contacting carbon disulfied and a binary fluoride of an element selected from the class consisting of groups IV–A, V–A and VI–A of the periodic table having an atomic number of 6–16, inclusive, at a temperature of at least about 1500° C. and thereby producing thiocarbonyl fluoride.

2. The process of claim 1 wherein the pressure is subatmospheric.

3. The process of claim 1 wherein the absolute pressure is 10–300 mm. of Hg.

4. The process of claim 1 wherein the binary fluoride is a carbon fluoride having no more than two carbons.

5. The process of claim 4 wherein the carbon fluoride is carbon tetrafluoride.

6. The process of claim 4 wherein the carbon fluoride is tetrafluoroethylene.

7. The process of claim 1 wherein the binary fluoride is sulfur tetrafluoride.

8. The process of claim 1 wherein the binary fluoride is nitrogen trifluoride.

9. The process of claim 1 wherein the binary fluoride is phosphorus pentafluoride.

References Cited in the file of this patent

Tyczkowski et al.: J.A.C.S., vol. 75, pp. 3523–26 (1953).